Dec. 20, 1966  V. A. FALKENAU  3,292,894

POROUS MOLD

Filed Oct. 1, 1962

INVENTOR
VERNON A. FALKENAU

BY James R. Hulen

AGENT

United States Patent Office 3,292,894
Patented Dec. 20, 1966

3,292,894
POROUS MOLD
Vernon A. Falkenau, Mishawaka, Ind., assignor to United States Rubber Company, New York, N.Y., a corporation of New Jersey
Filed Oct. 1, 1962, Ser. No. 227,240
3 Claims. (Cl. 249—134)

This invention relates to molds suitable for use in molding latex foam articles. More particularly, the invention relates to porous molds.

It has previously been the practice in the latex foam industry to make latex foam articles by casting latex froth into a closed surface mold usually made of a metallic material.

These closed surface molds were costly to manufacture and because of their bulk, presented numerous problems in temperature and moisture conditioning. The closed surface molds were also difficult to make and to clean.

In co-pending patent application Serial No. 227,245 to E. J. Bethe, filed October 1, 1962, now Patent No. 3,243,491, and assigned to the assignee of the present application, a new and improved method of making molded foam articles is disclosed and claimed. The method requires the use of a porous surface or mold in which to cast latex froth.

Because of the complex contour required for some of the molds, it has been difficult, if not impossible, to accurately reproduce the desired surface contour.

A still further object of this invention is to provide a porous mold capable of withstanding the chemicals used in the production of latex foam, the temperature of curing and the cycling in and out of heat.

A porous mold made in accordance with the invention comprises a contoured open mesh fabric impregnated with cured resinous material, which maintains the fabric in its contoured condition.

For a better understanding of the present invention, together with other and further objects thereof, reference is made to the following description, taken in connection with the accompanying drawings, and its scope will be pointed out in the appended claims.

Referring now to the drawings.

Figure 1:
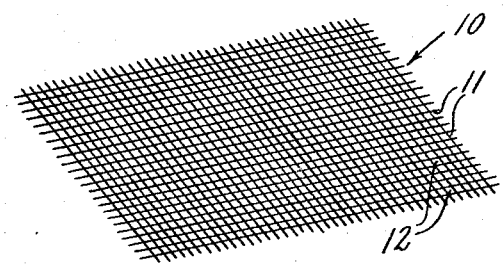
FIG. 1 is a plan view of a portion of an open mesh fabric.

Referring now more particularly to FIG. 1 of the drawing, a porous mesh fabric 10 is illustrated which is suitable for use with the present invention. The fabric is comprised of woven strands 11 and interstices 12. While it is possible to use other fabrics, such as dacron, nylon or cotton, glass fabrics, when properly encapsulated as described below, are more desirable because of their strength and resistance to degradation on recycling at fairly high temperatures under good conditions. These conditions prevail in the method described and claimed in the aforementioned patent application Serial No. 227,245 in which the instant mold is intended to be used.

A presently preferred fabric is a woven glass cloth fabric having a mock leno weave weighing approximately 20.7 ounces per square yard. The fabric is 0.30 inch thick and contains 40 warp yarns and 21 fill yarns per square inch. The glass fabric is preferably Volan treated. The Volan treatment consists of applying to the surface of the fabric a Werner type chromium complex (methacrylato chromic chloride) in isopropynol. This treatment provides considerable improvement in the adhesion, especially under moist conditions, between the glass surface and the reinforcing resin which is to be described below.

Figure 2:
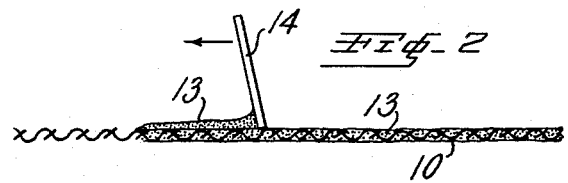
FIG. 2 is a side view of the fabric of FIG. 1, shown with resin being applied thereto.
Figure 3:
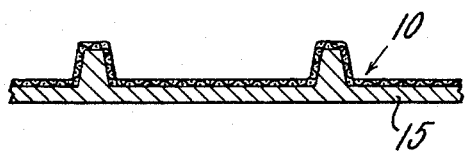
FIG. 3 is a cross-sectional view of a mold with the impregnated fabric of FIG. 2 shaped to the contour thereof.
Figure 4:
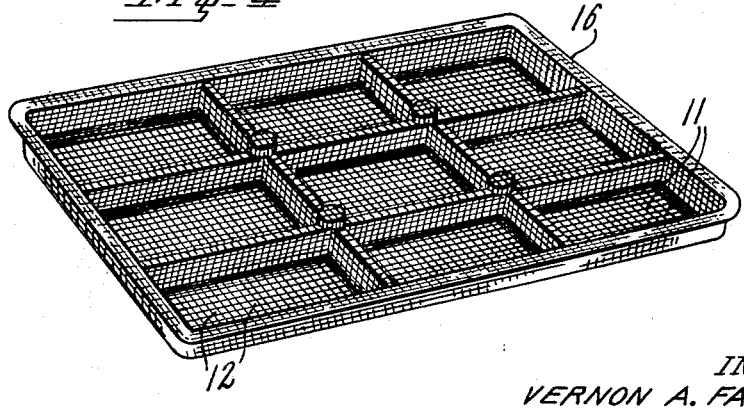
FIG. 4 is a perspectiev view of a completed porous mold made in accordance with the present invention.

Fabric 10 is coated with an activated thermo-setting resin 13 which is applied to the fabric by doctor blade 14 as illustrated in FIG. 2. Epoxy resins are presently preferred for the coating operation, however, other thermosetting resins such as polyesters, phenolics and rigid urethanes, would be useful.

A preferred epoxy resin is Epon 828 (Shell Chemical Company) which is made by reacting two mols of epichloro-hydrin with one mol of Bis Phenol A (a diphenol). This epoxy resin has a viscosity, at 73° F., of 10,000–20,000 cp., an epoxide equivalent weight of 175 to 210 and an hydroxyl equivalent weight of 85. Another epoxy resin which has been found to be very effective is Epon 815 which is made in substantially the same manner as Epon 828 with sufficient butyl glycidal ether (a reactive diluent) added to reduce the viscosity of the resin to approximately 500–900 cps.

Prior to coating fabric 10 with the resin, a curing agent is added to the resin. There is nothing critical in the selection of the curing agent, except that the resulting formulation should be curable at reasonable temperatures, say at temperatures of 200° F. or lower, and more preferably at room temperatures. I presently use Shell curing agent U, which is an adduct of diethylenetriamine and allyl glycidyl ether. Curing agent U has been found to work effectively with both Epon 828 and Epon 815. Other resin-curing agent systems which are preferred for this invention are Epon 828 with curing agent Z which is a eutectic liquid blend of 4-4'-methylenedianiline (MDA) and m-phenylenediamine (MPDA) and Epon 828 with TETA which is triethylenetetramine.

I do not, however, wish to limit my invention to the above curing agents since many other formulations can be used. Included among these are 3,3'-iminobispropylamine and diethylenetriamine (DTA).

In the preferred application I use 20–25 parts of Shell curing agent U per 100 parts of Epon 828 epoxy resin. Fillers, such as calcium carbonate or clays, can be added to the mixture in amounts up to 40 parts per 100 parts of resin.

The resin 13, as shown in FIG. 2, is applied to the fabric 10 by a doctor blade 14. Other means such as roller coaters, brushes or spraying can also be used. When the resin is to be sprayed, however, the resin, with curing agent added, is mixed with a suitable solvent, such as methyl ethyl ketone, to provide a sprayable material. In this case I prefer to dilute to the extent that the resin and curing agent are present in the amount of 10% solids.

In the application of the resin to the fabric it is important to deposit resin compound in amounts equal to approximately 40% of the weight of the glass fabric in a manner which will insure that the resinous compound thoroughly penetrates all portions of the glass cloth. Regardless of the coating method used, the interstices of the resulting coated fabric must be cleared of excess resin so as to insure that the interstices of the fabric are open to result in a porous cured resin fabric structure. Excess resin can be removed by rubber squeegees, by air blast or by blotting the surfaces of the fabric with an absorbent paper or a combination of any of the above methods. For example, I presently use a method which combines the use of a squeegee with kraft brown paper for blotting.

After the resin has thoroughly penetrated the glass fabric the fabric is placed over the surface of a mold 15 and conformed to the contour thereof. The fabric may be formed by hand or a matched mold may be brought into contact with mold 15 to facilitate forming. If the glass fabric tends to pull away from the surface of mold 15, a vacuum blanket may be used to hold the fabric in place until the resin compound has cured to impart a permanent set to the fabric.

It is highly desirable to use a resin system which will afford some working time during which the coated fabric can properly be conformed to the mold cavity. The system described is an air cure system and begins to cure at room temperature in approximately 15 minutes. This is evidenced by thickening of the resin deposited on the fabric to the point where it will not run off the fabric. In approximately 45 minutes the cure has progressed to the point where the coated fabric is too stiff to conform easily and readily to the mold cavity surface. Therefore, the system described affords the operator approximately 15 to 45 minutes working time to mold the coated fabric to the mold surface. The formulation described air cures in approximately 24 hours.

Mold 15 which is used in the preparation of the porous mold is coated, for release purposes, with virtually any conventional waxy material or with non-waxy barrier films such as polyvinyl alcohol. Actually it is more preferable in this case to use non-waxy barrier films as they tend to lessen future problems in applying the coagulating agents described in aforementioned patent application Serial No. 227,245 for making foam rubber in the porous mold. Waxy mold surfaces in the above application would be very undesirable as it would be extremely difficult to properly wet all portions of the porous fabric mold surface with the necessary coagulating or gelling agents.

After the fabric has been conformed to the exact contour of mold 15, the resin is cured. During curing the resin rigidifies the strands of fabric 10 and thereby imparts the permanent contour of mold 15 to the fabric. After cure, the open mesh glass fabric mold is removed from the mold 15.

Although the mold at this stage has been found to be very effective for use in the production of latex foam articles, it is desirable to further reinforce the mold to prevent sag or buckling. This can be accomplished in many ways but the preferred method is to encapsulate the strands of the open mesh fabric in metal.

Any conventional electroplating or electroforming method may be used to perform the encapsulation step. The presently preferred method is accomplished by applying to the finished epoxy-glass porous mold an electrically conductive material, such as finely divided particles of metallic silver. This is usually accomplished by spraying all surfaces of the epoxy-glass porous mold with a dispersion of finely divided silver metal particles in butyl acetate, which upon drying will leave a thin film of silver particles on the surface of the porous mold. There are alternate methods of conductively coating non-metal surfaces, such as first exposing the non-metal surface (resin-glass porous mold) to a solution of stannous chloride, drying, and thereafter spraying the stannous chloride activated surface of the porous mold with ammoniacal solution of silver nitrate (2 parts) which is subsequently reduced on the surface of the mold with formaldehyde (1 part). This process also leaves on the surface of the porous mold a very thin layer of silver metal which provides the necessary conductive surface for further electroplating operations. The conductively coated mold is then electroplated with nickel, copper, etc., to form on the mold surface a layer of metal from .010–.020" thick. In this particular case I prefer these metals because of the strength they provide to the porous mold structure. However, these metals also cause some darkening of rubber compounds coming in contact with the metals. Therefore, for best results it is further necessary to plate a zinc or cadmium metal layer over the thicker nickel or copper layer to provide protection for the foam product. It is also possible to use an epoxy resin as a sealing layer over the nickel or copper.

It should be noted that the deposition of metal on the porous mold surface will not only provide added strength to the mold but will also provide a protective layer over the glass-epoxy resin surface to reduce the degradation effects of heat and moisture on the surface.

Another method which has been found to be effective for reinforcing the porous mold is to apply a sheet of open weave, resin-reinforced glass cloth to the back side of the mold. The pores of the mold remain open and a good reinforcement is provided.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. A porous mold for use in the molding of latex foam articles, wherein said mold is subjected to relatively high temperatures and moist conditions, comprising: an open mesh woven fabric having the contour of the articles to be molded, said fabric having strands impregnated with cured resinous material to maintain said fabric in a rigid condition and the interstices of said fabric being substantially free of said resinous material.

2. The porous mold of claim 1 wherein said fabric is glass.

3. The porous mold of claim 1 wherein said impregnated strands are encapsulated in metal.

References Cited by the Examiner

UNITED STATES PATENTS

| | | | |
|---|---|---|---|
| 1,621,281 | 3/1927 | Sheffield | 249—134 |
| 1,669,266 | 5/1928 | Stevens | 18—56 |
| 1,856,475 | 5/1932 | Frost | 117—160 |
| 1,959,762 | 5/1934 | Mains | 264—137 |
| 2,868,667 | 1/1959 | Bowles | 117—105 X |
| 2,877,498 | 3/1959 | Schneider | 18—56 X |
| 2,918,392 | 12/1959 | Beller | 117—160 |
| 2,998,922 | 9/1961 | Gibson | 117—160 |
| 3,070,870 | 1/1963 | Alexander et al. | 18—56 |
| 3,119,888 | 1/1964 | Supitilov | 264—137 |
| 3,153,915 | 10/1964 | Deith | 249—134 |

J. SPENCER OVERHOLSER, *Primary Examiner.*

ALEXANDER H. BRODMERKEL, ROBERT F. WHITE, J. HOWARD FLINT, JR., *Examiners.*

M. R. DOWLING, *Assistant Examiner.*